(12) United States Patent
Yates

(10) Patent No.: US 11,790,030 B2
(45) Date of Patent: Oct. 17, 2023

(54) CREATING AN EFFECTIVE PRODUCT USING AN ATTRIBUTE SOLVER

(71) Applicant: Promoted.ai, Inc., San Francisco, CA (US)

(72) Inventor: Andrew Donald Yates, San Francisco, CA (US)

(73) Assignee: Promoted.ai, Inc., San Francisco, CA (US)

( * ) Notice: Subject to any disclaimer, the term of this patent is extended or adjusted under 35 U.S.C. 154(b) by 0 days.

(21) Appl. No.: 17/171,713

(22) Filed: Feb. 9, 2021

(65) Prior Publication Data

US 2021/0383426 A1    Dec. 9, 2021

Related U.S. Application Data

(60) Provisional application No. 63/034,894, filed on Jun. 4, 2020.

(51) Int. Cl.
| | |
|---|---|
| *G06Q 30/02* | (2023.01) |
| *G06F 16/958* | (2019.01) |
| *G06N 20/00* | (2019.01) |
| *G06Q 10/0639* | (2023.01) |
| *G06F 16/957* | (2019.01) |

(Continued)

(52) U.S. Cl.
CPC ........ *G06F 16/958* (2019.01); *G06F 16/9577* (2019.01); *G06N 20/00* (2019.01); *G06Q 10/06393* (2013.01); *G06Q 30/0245* (2013.01); *G06Q 30/0254* (2013.01);

(Continued)

(58) Field of Classification Search
CPC ............... G06F 16/958; G06F 16/9577; G06F 16/9538; G06N 20/00; G06N 7/005; G06Q 10/06393; G06Q 30/0245; G06Q 30/0254; G06Q 30/0255; G06Q 30/0275; G06Q 30/0276; G06Q 30/0277
See application file for complete search history.

(56) References Cited

U.S. PATENT DOCUMENTS

| | | | | |
|---|---|---|---|---|
| 9,329,842 | B1 * | 5/2016 | Chan | ........................ G06F 8/38 |
| 11,062,196 | B2 * | 7/2021 | Miikkulainen | ......... G06F 16/26 |

(Continued)

OTHER PUBLICATIONS

International Application No. PCT/US2021/033673—International Search Report and Written Opinion dated Aug. 24, 2021, 18 pages.

(Continued)

*Primary Examiner* — Eric R Netzloff
(74) *Attorney, Agent, or Firm* — Cognition IP, P.C.; Edward Steakley

(57) ABSTRACT

Disclosed here is a system that can obtain attributes of an advertisement, where an attribute has a continuous value, and a range of acceptable values is uncertain. The system can create a file including contents that when provided to a predetermined function produce a value of the attribute. Based on the file, the system can generate values corresponding to the attributes. Based on the generated values, the system can create the advertisement. The system can obtain a response data to the created advertisement and can fit a multidimensional function to the attributes and the user response data. Based on the multidimensional function, the system can determine next values and next ranges, where the next values and the next ranges indicate an improvement in the response data.

19 Claims, 10 Drawing Sheets

(51) Int. Cl.
  *G06Q 30/0251* (2023.01)
  *G06Q 30/0273* (2023.01)
  *G06Q 30/0241* (2023.01)
  *G06Q 30/0242* (2023.01)

(52) U.S. Cl.
  CPC ..... *G06Q 30/0255* (2013.01); *G06Q 30/0275* (2013.01); *G06Q 30/0276* (2013.01); *G06Q 30/0277* (2013.01)

(56) References Cited

U.S. PATENT DOCUMENTS

| | | | |
|---|---|---|---|
| 11,087,046 B2* | 8/2021 | Minwalla | G06N 7/01 |
| 2003/0149603 A1* | 8/2003 | Ferguson | G06Q 30/06 705/64 |
| 2008/0183672 A1* | 7/2008 | Canon | G06F 16/9577 |
| 2010/0161422 A1* | 6/2010 | Zeevi | G06Q 30/0244 705/16 |
| 2011/0004513 A1 | 1/2011 | Hoffberg | |
| 2016/0092959 A1 | 3/2016 | Gross | |
| 2016/0291914 A1 | 10/2016 | Yu et al. | |
| 2016/0358229 A1 | 12/2016 | Bhalgat et al. | |
| 2017/0024761 A1 | 1/2017 | Ruiz et al. | |
| 2017/0046110 A1* | 2/2017 | He | H04L 67/02 |
| 2017/0085962 A1 | 3/2017 | Maughan et al. | |
| 2017/0249658 A1 | 8/2017 | Bargas et al. | |
| 2018/0362295 A1* | 12/2018 | Patel | B66B 1/3461 |
| 2018/0365295 A1* | 12/2018 | Paff | G06F 16/9577 |
| 2019/0034830 A1* | 1/2019 | Burangulov | G06F 16/953 |
| 2019/0158901 A1 | 5/2019 | Kaya et al. | |
| 2019/0392487 A1* | 12/2019 | Duke | G06N 3/08 |
| 2020/0099746 A1 | 3/2020 | Tiwana et al. | |
| 2020/0167832 A1* | 5/2020 | Pinel | G06T 11/40 |
| 2020/0192777 A1* | 6/2020 | Allen | G06F 7/023 |
| 2020/0349441 A1* | 11/2020 | Zhang | G06N 3/0472 |
| 2021/0097126 A1 | 4/2021 | Martini et al. | |
| 2021/0224687 A1* | 7/2021 | Goldszmidt | G06K 9/6268 |
| 2021/0334698 A1* | 10/2021 | Vo | G06N 20/00 |
| 2022/0084802 A1* | 3/2022 | Gioioso | H01J 49/0045 |
| 2022/0300177 A1* | 9/2022 | Biswas | G06N 20/00 |

OTHER PUBLICATIONS

International Application No. PCT/US2021/033682—International Search Report and Written Opinion dated Sep. 14, 2021, 17 pages.
Barford, et al., "Adscape: Harvesting and Analyzing Online Display Ads", in Proceedings of the 23rd international conference on World wide web (WWW '14). Association for Computing Machinery, New York, NY, USA, 597-608 (Year: 2014).
Deb, Anirban, et al., "Under the Hood of Uber's Experimentation Platform", Uber Engineering, https://eng.uber.com/xp/, 2021, 14 pages.

* cited by examiner

```
         N_SEGMENTS = 1000
210      BASELINE_RANGE = [0, 99]
220      CONTROL_RANGE = [100, 199]
230      EPOCH = 0
240
         ENV = {
             "quality_start_limiting": {
250              "pool": {
                     "dist": "uniform_multi",
260                  "base": 3,
270                  "multi": 2,
                 },
             },    280
             "quality_limit": {
                 "baseline": 13.6,
                 "pool": {
                     "dist": "uniform_multi",
                     "base": 13.6,
                     "multi": 2,
                 },
             },
             "organic_alloc_qual_discount": {
                 "control": 1,
                 "baseline": {
                     "func": "linear",
                     "var": "screensize",
                     "multi": 0.3,
                     "offset": 100,
                     "minval": 0,
                     "maxval": 100,
                 },
                 "pool": {
290                  "dist": "uniform_multi",
                     "base": {
                         "func": "choose",
                         "var": "platform",
                         "choices": {
                             "default": 1,
                             "ios": 2,
                             "android": 3,
                         }
                     },
                     "multi": 2,
                 }
             },
```

*FIG. 2A*

```
"same_promoter_additive": {
    "control": 1,
    "baseline": 1,
    "pool": {
        "dist": "uniform_multi",
        "base": 1,
        "multi": 2,
    },
    "custom": [
        {
            "range": [200, 299],
            "value": 4,
        },
        {
            "range": [300, 399],
            "value": 2,
        },
    ]
  }
}
```

*FIG. 2B*

CREATING AN EFFECTIVE PRODUCT USING AN ATTRIBUTE SOLVER

CROSS-REFERENCE TO RELATED APPLICATIONS

This application claims priority to the U.S. provisional patent application Ser. No. 63/034,894 filed Jun. 4, 2020, which is incorporated herein by this reference in its entirety.

TECHNICAL FIELD

The present application is related to advertisements, and more specifically to methods and systems that create an effective advertisement using an attribute solver.

BACKGROUND

Many services provided over the Internet use A/B user testing to determine optimal configurations of their product. Because the service is dynamically provided from a server, some users can get version A of the product, and some other users can get version B of the product. Using statistical methods, the service provider can measure the response of users with different versions and estimate if version A or version B produces a more desirable user response. The experiment then ends, and the platform can make a decision to change the product based on the results. The difference between a version of the product in the A version and in the B version is a set of attributes including enabled or disabled features or variable values.

The problem with the A/B user testing is that attributes tested are discrete, binary decisions, such as enable or disable feature, or a discrete set of values for a numerical variable. The range of acceptable variable values must be clearly defined. Dependencies between attributes are hard to determine when the final decision needs to be made.

In addition, the A/B tests can be so numerous that the sheer number creates infrastructure problems. For example, the tests result in such large amounts of log data that processing the result becomes inefficient or in some cases infeasible.

SUMMARY

Unlike in the A/B user testing where attributes are discrete values (e.g., binary), the system presented here can include attributes that are continuous and/or numerical values. The range of acceptable variable values can be uncertain and can change during the continuous testing. The system can determine correlation and causal relationships between the attributes. For example, if "percent of screen occupied by advertisements" and "advertisement quality control" parameters interact to produce a user response, the system can determine the dependency relation and can vary the two attributes jointly. The system can run continuously because there is no final "decision" to be made. The testing is expected to continuously evolve, so results from one period of time do not necessarily represent results in the future. For example, users can learn to ignore ads, and the number and type of advertisers can change seasonally and over years. In addition, the system does not generate large amounts of data because the generation of test attribute values can be done procedurally with a small amount of input that can be stored in a configuration file. The configuration file is sufficiently small and can quickly be searched. Various versions of the configuration file can be stored in a version control system.

BRIEF DESCRIPTION OF THE DRAWINGS

These and other objects, features, and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

FIGS. 2A-2B show an example configuration file.

DETAILED DESCRIPTION

Terminology

Figure 1:
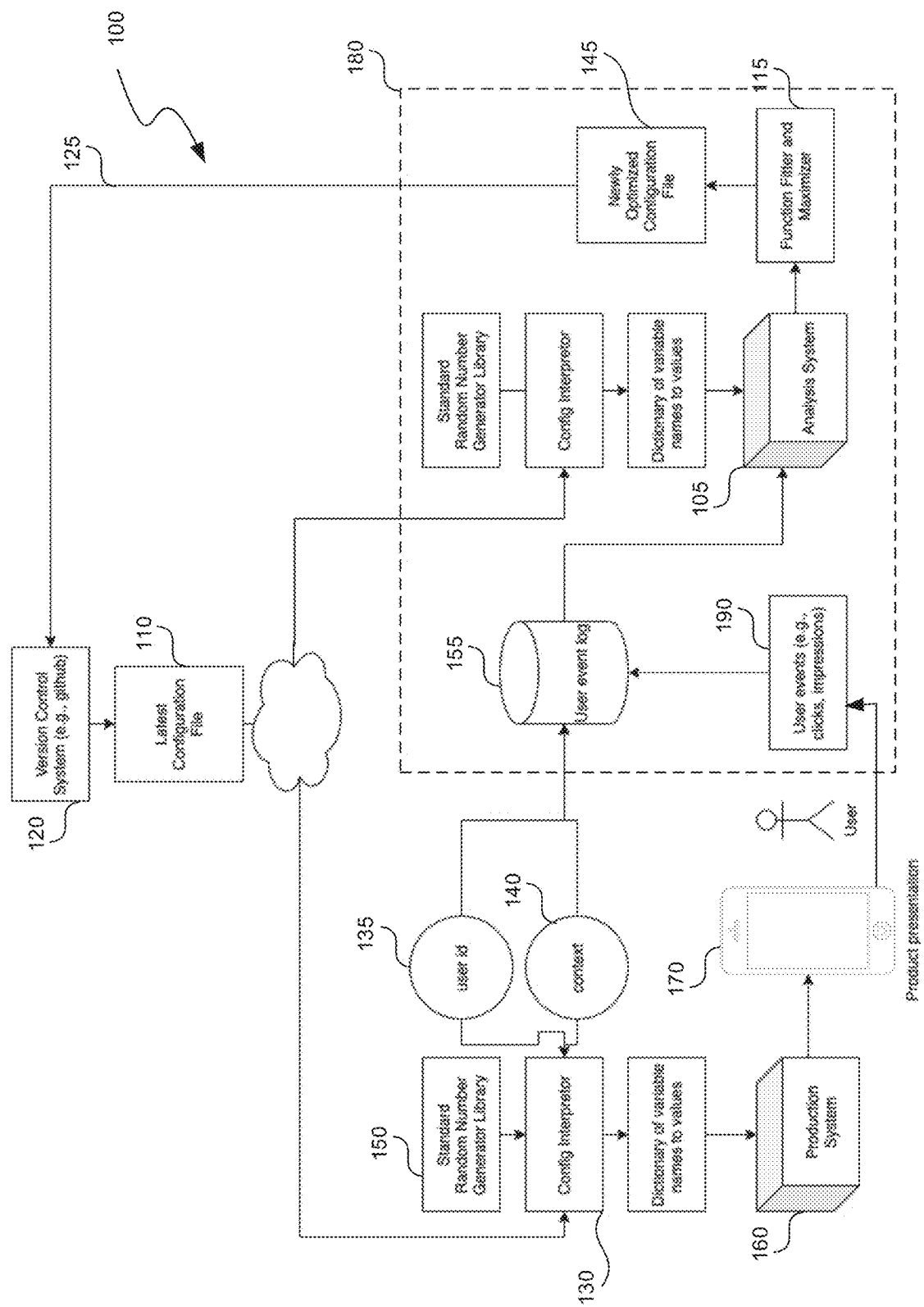
FIG. 1 is an overall system diagram.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed therebetween, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Creating an Effective Product Using an Attribute Solver

Unlike in A/B user testing which uses discrete values (e.g., binary), the system presented here can include attributes that are continuous and/or numerical values. The range of acceptable variable values can be uncertain and can change during the continuous testing. The system can determine correlation and causal relationships between the attributes. For example, if "percent of screen occupied by advertisements" and "advertisement quality control" parameters interact to produce a user response, the system can determine the dependency relation and can vary the two attributes jointly. The system can run continuously because there is no final "decision" to be made. The testing is expected to continuously evolve, so results from one period of time do not necessarily represent results in the future. For example, users can learn to ignore ads, and the number and type of advertisers can change seasonally and over years. In addition, the system does not generate large amounts of data because the generation of test attribute values can be done procedurally with a small amount of input that can be stored in a configuration file. The configuration file is sufficiently small and can quickly be searched. Various versions of the configuration file can be stored in a version control system.

FIG. 1 is an overall system diagram. The system 100 can generate all attribute values, for example, hyperparameter variables, randomly from a single configuration file 110 which specifies the distribution of values to draw from. The system 100 can also receive a manual specification of experiment version assignments like in traditional A/B testing frameworks that is compatible with the system's randomization framework.

The configuration interpreter 130 can generate the values of the attributes based on the configuration file 110, user (identifier) ID 135, context 140, and a predetermined function 150 such as a standard random number generator library. The configuration interpreter 130 can be deterministic based on the user ID 135, variable name, and an epoch value which, when changed, redraws all variable values. Because the random generation method 150 uses industry-standard algorithms and libraries, any system can produce variable values without coordination or logging, thus reducing bandwidth and memory. For example, the backend systems which apply the attribute values do not need to coordinate or transmit information with the statistical analysis software used to interpret results. Also, because all experimental variance is defined in a single file 110, this file can be managed using standard version control software 120 like GitHub. Systems can subscribe to version control changes to update locally cached copies of the configuration file to avoid system calls to a centralized service and for efficiency.

Furthermore, while the system 100 can support the configuration of traditional A/B experiments, which is limited to discrete values of a single attribute, the system 100 can support statistical testing of the impact of all attributes simultaneously on an objective, such as a product design, and the attribute values can be continuous. The system 100 can also support defining different value distributions for different contexts without creating new attribute names.

The system 100 can generate a product designed according to the generated attribute values. The attribute values governing the product design can be specific for a particular user, and can vary from user to user. The product can be associated with a software. The product can be an advertisement ("ad"), a user interface, even an aspect of technical software design including response times, memory consumption, data plan usage, etc. A production system 160 can present the product to a device 170 associated with the user.

A solver 180 can collect user response data 190. The solver 180 can include an analysis system 105 and a function fitter and maximizer 115, described in more detail below. The function fitter and maximizer 115 ("function fitter") can fit a multidimensional function ("function") of all variables including the attributes and context to an observed objective. The observed objective can include "sum of advertising revenue," "sum of long-term advertising revenue," "sum of short-term advertising revenue," "user engagement with the product," "probability of user retention after a period," or "probability or expected sum of user actions like engagements or purchases," etc. The function fitter 115 can estimate statistical confidence in the function and can determine how to change the attribute values to maximize the function on the next iteration 125. The changed attribute values can include explore and exploit characteristics. For example, if the attribute values have reached a local optimum, such as a local minimum or a maximum, the function fitter can decide whether to try to find a global optimum, for example, "explore," by drastically changing the attribute values, or the function fitter 115 can decide to stay in the local optimum, for example, "exploit," and not change the attribute values. In addition, the optimum value is expected to change over time. Consequently, some degree of exploration is always warranted even if the best parameter set was known in a previous time period.

The newly optimized configuration file 145 can replace the configuration file 110 from the previous iteration. The newly optimized configuration file 145 can context-split variables automatically based on analyzing the user response data, the attributes, and the context. Context can indicate an environment associated with the user and can depend on the product being optimized. Context can include country, device, product version, and/or season. For example, the optimal ads per page could be three for iOS and five for Android, where iOS and Android are context variables. The function generated by the function fitter 115 can be after treatment by variables over a long period of time. For example, the response maximized could be "sum of ad revenue" and the variables can be "percent of screen occupied by advertisements" and "advertisement quality control." A single user could receive the same variable values over a long period, such as a month or three months, and the objective is to maximize future revenues by extrapolating trends of user behavior into the future when the immediate response (increasing number of ads to increase revenue) is different from the long-term response (increasing number of ads drives away users, lowering revenue).

FIGS. 2A-2B show an example configuration file. The configuration file 200 is a text file in a standard data definition language, such as JSON. The first lines define the experiment environment. For example, variable 210, N_SEGMENTS, represents the number of user buckets into which each user is randomly assigned. Variable 220, BASELINE_RANGE, represents the user buckets assigned to the currently known best parameter value. Variable 230, CONTROL_RANGE, represents the user buckets assigned to the last known best parameter values. Variable 240, EPOCH, influences the generation of attribute values. Changing the value of the variable 240 changes the draws of all randomly generated variables, as explained below. EPOCH can also indicate a version of the configuration file 200.

The configuration file 200 can include a name of the attribute 250 and a distribution 260 indicating a probability of occurrence of the value of the attribute. The distribution 260 can be a uniform distribution, a normal distribution, a Poisson distribution, a fractal distribution, etc. Further, the configuration file 200 can include various properties 270, 280 of the distribution 260. For example, when the distribution 260 is a normal distribution, the properties 270, 280 can specify the mean and the sigma of the distribution 260.

The configuration file 200 can also include information about causal relationships between variables, as described in this application. For example, entry 290 indicates that the attributes controlling the number of advertisements presented is causally related to the context indicating the type of device. Specifically, entry 290 indicates that if the type of device is iOS, the number of advertisements to present is 2, if the type of device is Android, the number of advertisements to present is 3, and for any other device the number of advertisements to present is 1. In other words, the configuration file 200 can include context variables that aren't controlled by the solver, but that interact with the attributes determined by the solver such that the optimal value of the attributes also depends on the value of context variable. For example, "the best number of ads to show per device" is an attribute determined by the solver that depends on a context variable, namely, the device type. The solver can't control the user device. The solver can only solve for the number of ads to show. However, the best number of ads to show depends on the user device of the current request.

Figure 3:
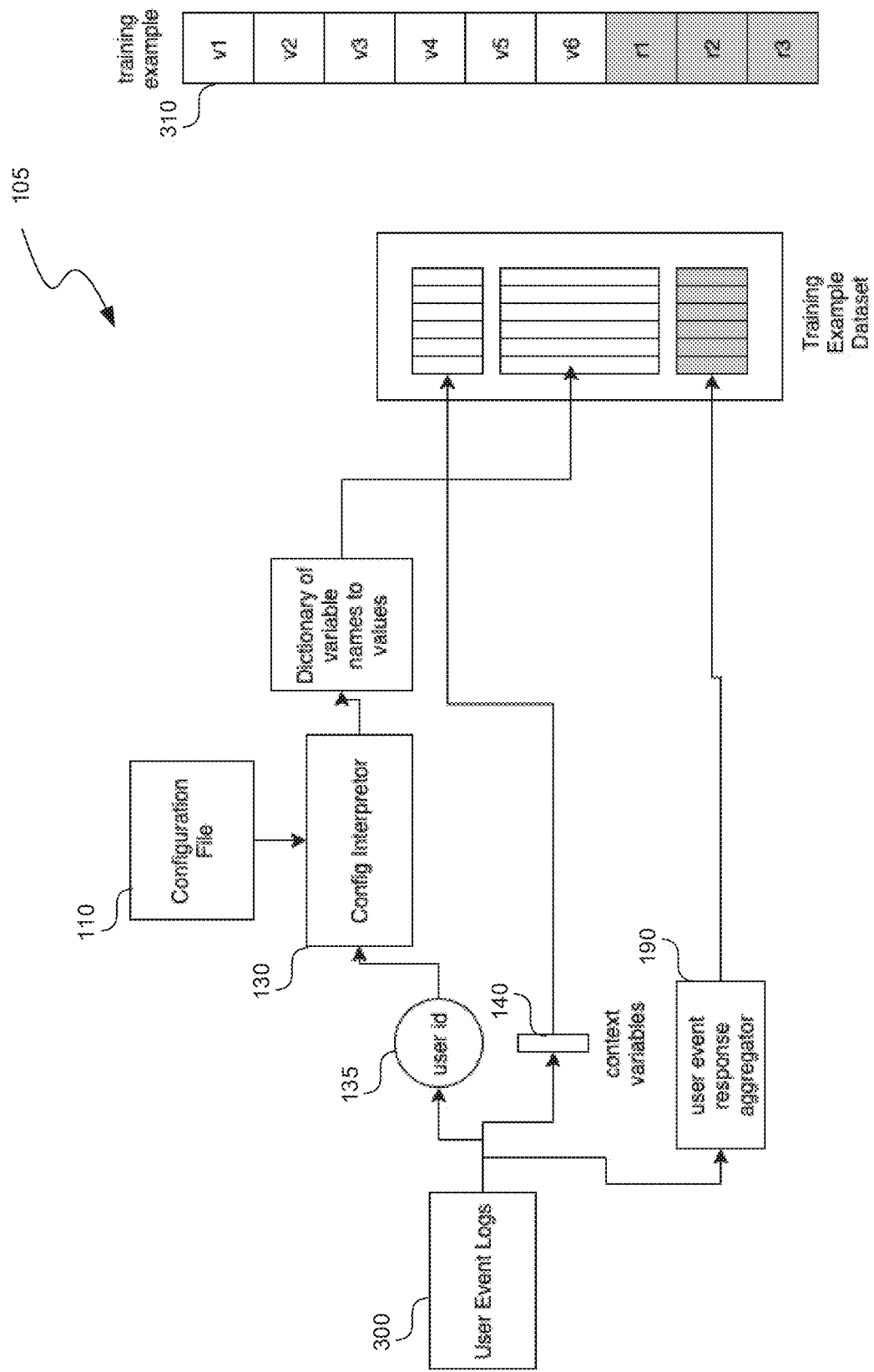
FIG. 3 shows the components of the analysis system.

FIG. 3 shows the components of the analysis system. The analysis system 105 can transform user event logs 300 into training examples to learn the causal relationship between variables. The variables can include attributes, the context 140, and the user response data 190. The features v1-v6 can include the attributes and the context. The context can include country, device, or season. The user response data 190 can be immediate, like a click. Alternatively, or in addition, the user response data 190 can be aggregated over time, such as the sum of revenue and engagement after an extended exposure to the product governed by a set of attributes included in features v1-v6.

User event log 155 in FIG. 1 may not include the attribute included in features v1-v6 values used at the time that the user events were generated. Consequently, the user event log 155 is small and can be efficiently stored in memory, producing a small memory footprint. Instead, the configuration interpreter 130 can regenerate the attribute values that must have been used at the time that the user events were generated. The configuration interpreter 130 can do that using the user ID 135, and configuration file 110 existing at the time, and currently stored in a version control system 120 in FIG. 1.

Each training example 310 can include multiple features v1-v6 representing attribute values and context values, as well as multiple response labels r1-r3 generated from the user events. The multiple response labels r1-r3 can correspond to the user response data 190.

Figure 4:
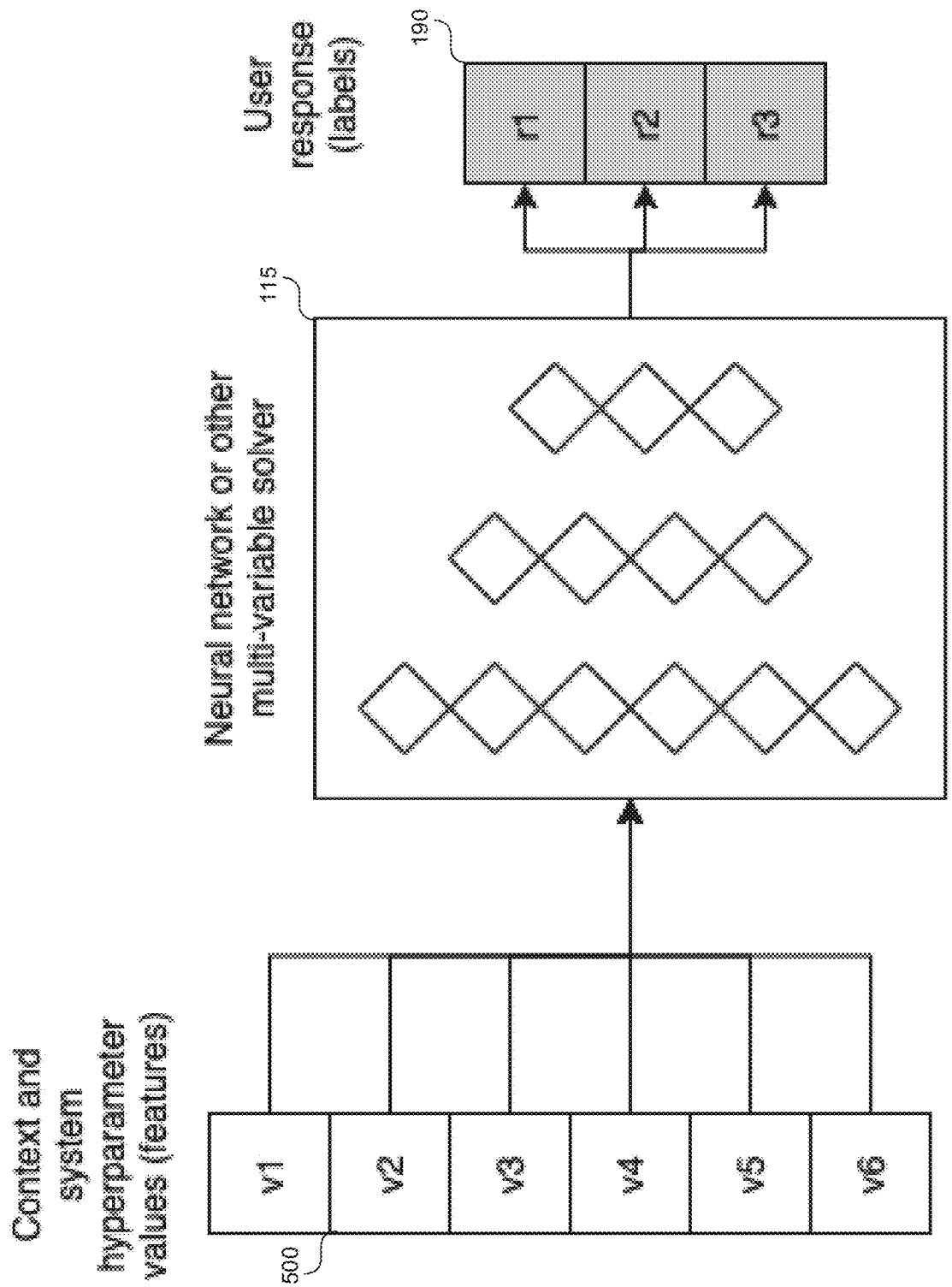
FIG. 4 shows the components of the function fitter.

FIG. 4 shows the components of the function fitter. The function fitter 115 can be an artificial intelligence (AI) model fitting the features (including attribute values per user, context) to the user response data 190. The function fitter 115 can be trained using standard AI training techniques. For example, the function fitter 115 can be a neural network that can simultaneously learn the function of all features 500 together to each response 190 in a technique called multi-task learning.

To estimate statistical confidence of the function fitter 115, a processor associated with the function fitter 115 can use permutation testing. Specifically, the processor can randomly combine the features 500 and the response data 190 and retrain the model a predetermined number times, for example, 1000 times. The processor can record the distribution of model losses per permutation on a test set. Model loss is the penalty for a bad prediction. That is, loss is a number indicating how bad the model's prediction was on a single example. If the model's prediction is perfect, the loss is zero; otherwise, the loss is greater. If the true feature and label associations fit a model with a resulting loss of less than the total number of tests, such as 1000, the p-value can be said to be less than $1/1000$. The p-value indicates the statistical confidence of the function. The lower the p-value, the higher the statistical confidence.

The processor can use statistical confidence to inform estimates of the exploration range of attributes. Also, the processor can use statistical confidence to judge if the overall solver configuration has produced measurable value to the system through optimization. If the statistical confidence is low, then the low statistical confidence could indicate any of:

1) a system error—something is broken or not working as expected
2) there is not enough data to train the model
3) there is no causal relationship between the attributes within their explored ranges and the objective.

Based on the statistical confidence, the processor can determine the next step. For example, if there is a system error and/or there is not enough data to train the model, the processor can send a notification indicating the issue. If there is no causal relationship between the attributes within their explored ranges in the objective, the processor can select a new set of ranges for the attributes.

Figure 5:
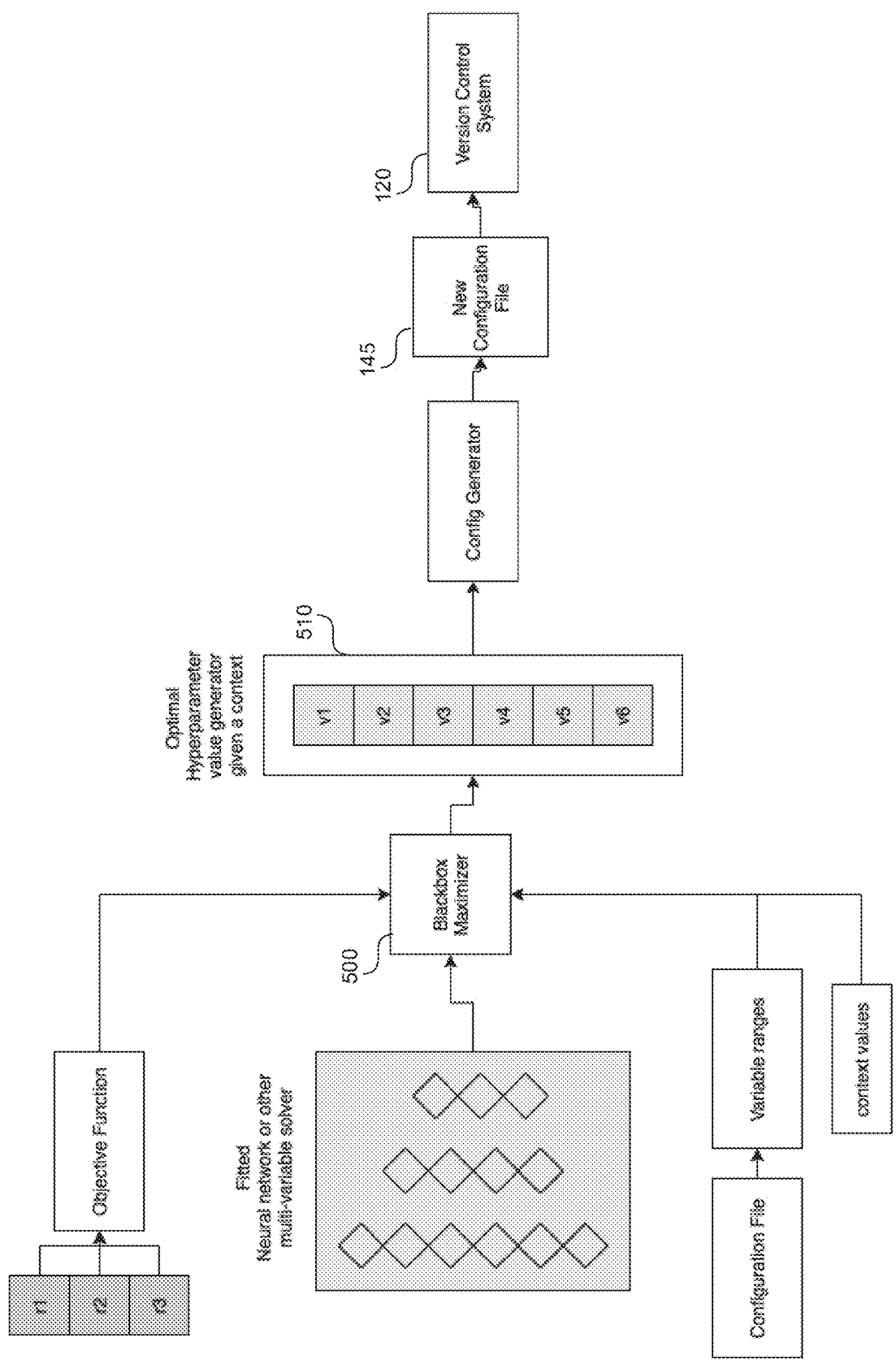
FIG. 5 shows the components of the maximizer.

FIG. 5 shows the components of the maximizer. The maximizer 500 can be part of the function fitter and maximizer 115 in FIG. 1. After the function of the features and response data is fitted, the maximizer 500 can maximize the fitted function to achieve the next set of attribute values and ranges of the attribute values, given a context.

To generate the next set of attribute values and ranges, the maximizer 500 can determine a function 510 that generates a point estimate and a range for each attribute. The attribute values and ranges, and/or the function 510 generating them, can be used to generate a new configuration file 145. The new configuration file 145 can be uploaded to the version control system 120 to track changes and to serve to other systems.

Figure 6:
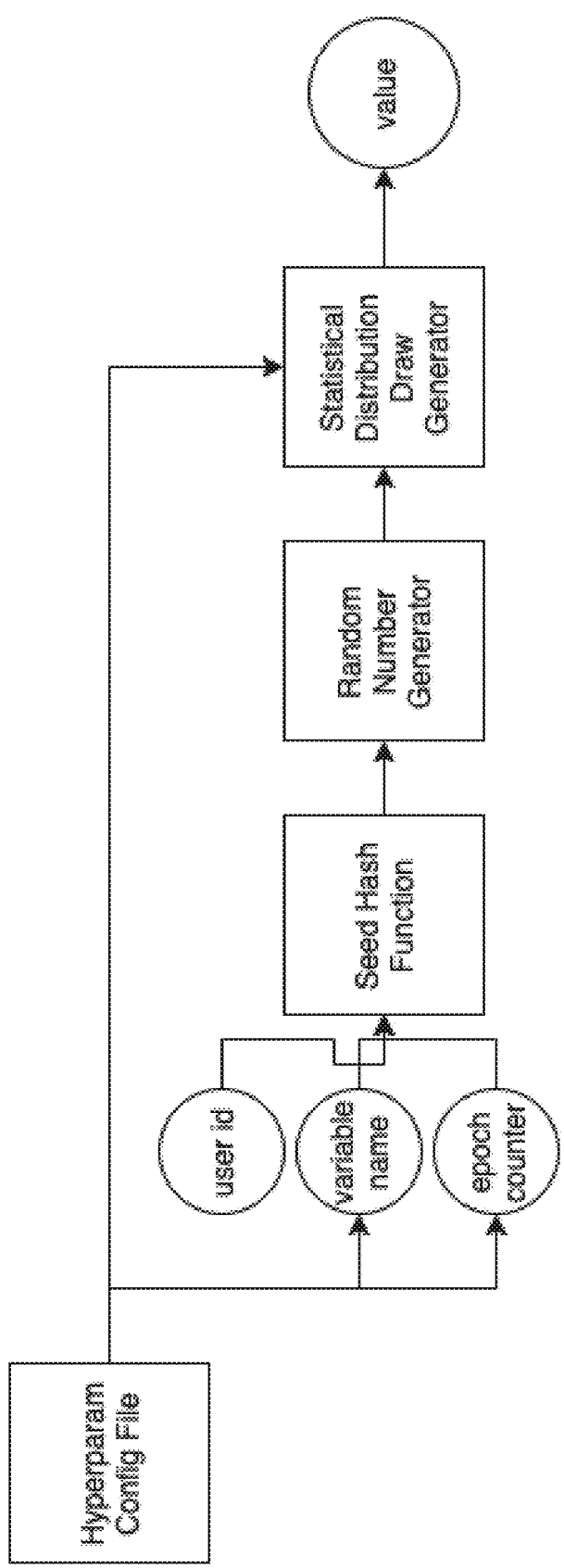
FIG. 6 shows the operation of the configuration interpreter.

FIG. 6 shows the operation of the configuration interpreter 130. The hyperparameter configuration file 110 contains a list of attribute names and distribution definitions. Given the attribute name 600, the epoch counter 610, and a user ID 135, the configuration interpreter 130 can generate a unique seed using a hashing function 620. This seed is provided to initialize a random number generator 630 uniquely for every (UserID 135, VariableName 600, EpochCounter 610)-tuple. The random number generator 630 output can be transformed to draw from a statistical distribution as defined in the configuration file. For example, the output can draw from a normal distribution with min and max values of −3 and +3. The output of the random number generator 630 can be used to specify the mean and/or the standard deviation of the normal distribution. The transformed draw from the statistical distribution is the value.

The same (UserID, VariableName, EpochCounter)-tuple always produces the same value given the same hash function 620 and random number generator algorithm 630, but that value is random. The various systems always use the same hash function and random number generator so that the (UserID, VariableName, EpochCounter)-tuple always produces the same value in the various systems without logging or coordination between these systems.

Figure 7:
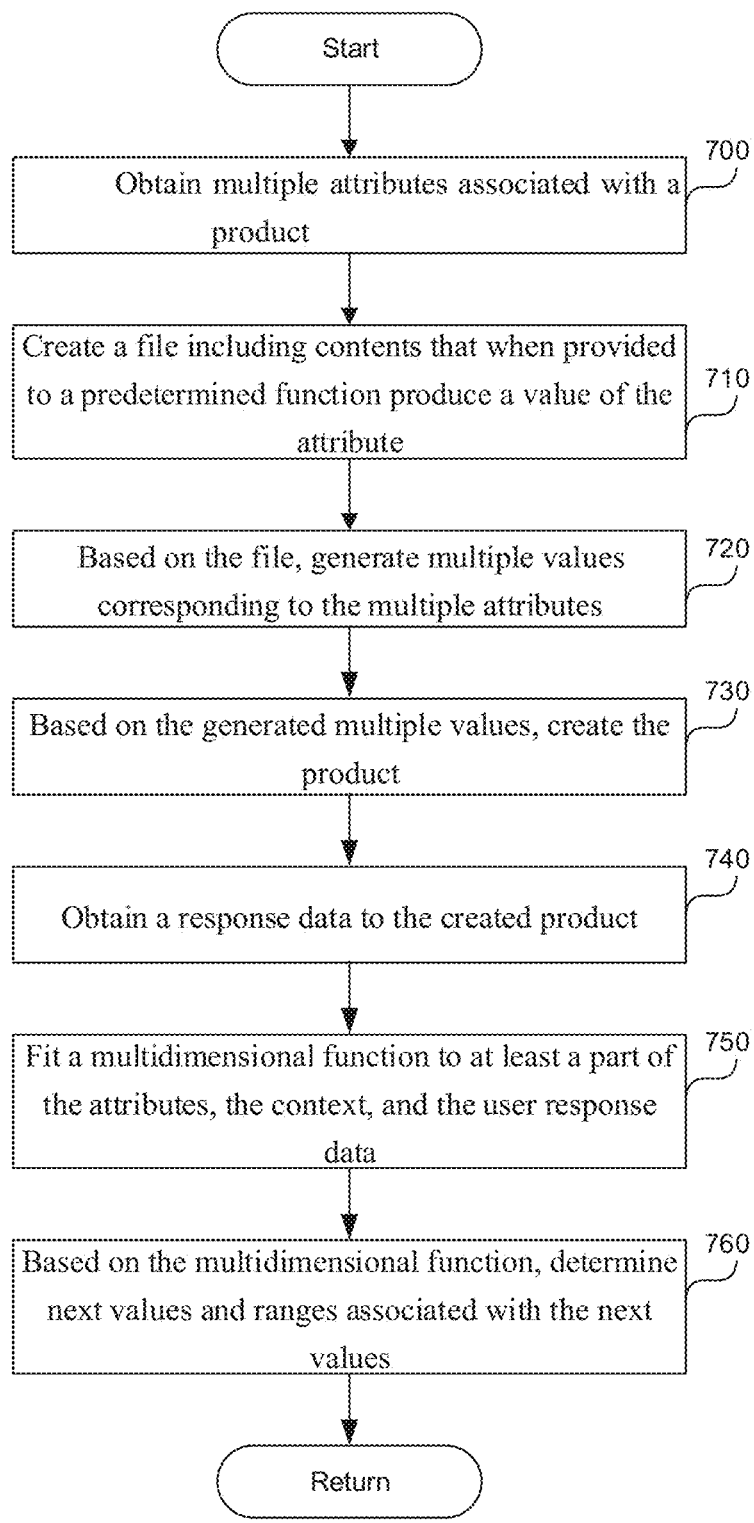
FIG. 7 is a flowchart of a method to continually generate an effective product by determining attributes of a product presented to a user.

FIG. 7 is a flowchart of a method to continually generate an effective product by determining attributes of a product presented to a user. The product can be an advertisement, a user interface, or even an aspect of technical software design including response times, memory consumption, data plan usage, etc.

In step 700, a hardware or software processor executing instructions describing this application can obtain multiple attributes associated with a product and/or a context. An attribute can have a continuous value, and a range of acceptable values can be uncertain and/or unknown. The attribute can include "percent of screen occupied by advertisements," "quality score," and/or an "advertisement quality control." The context can include a country, a device, or a season. One implementation of a "quality score" is a weighted sum of different engagement probabilities.

"Advertisement quality control" is a weighted sum of other quality scores. The system can solve for the weights in combination with other attributes, such as:

how much to weigh the "total quality" score versus advertiser bidding for delivery priority;

how many ads to show per page. This attribute can have many sub-attributes like spacing, distance from top, adjacency rules, contextual variability like device or user time since account creation, etc.;

a "maximum" quality score, which also can have an exponential smoothing decay, described with additional sub-attributes;

attributes for repetition of ads from the same advertiser or the same category within a page or within a period of time;

attributes for controlling priorities for different categories of content, e.g. "newness", or different creative types, e.g. "video" or "live feed", or content categories, e.g. "gardening" and "cats."

In step 710, the processor can create a configuration file having a small memory footprint and including contents that when provided to a predetermined function produce a value of the attribute. The size of the configuration file can be on the order of kilobytes. A version control system can store the various versions of the configuration file. The various versions of the configuration file are easy to search because of their small size.

In step 720, based on the configuration file, the processor can generate multiple values corresponding to the multiple attributes, as explained in FIG. 6. To generate the multiple values, the processor can obtain from the configuration file a name of the attribute, a distribution indicating a probability of occurrence of the value of the attribute, and an epoch counter. The distribution can be a uniform distribution, a normal distribution, a Poisson distribution, a fractal distribution, etc. The processor can obtain a unique user identification (ID) associated with the user. The processor can generate a unique seed based on the user ID, the name of the attribute, and the epoch counter. The processor can generate a random number based on the unique seed and can generate the value of the attribute based on the unique seed and the distribution.

In step 730, based on the generated values, the processor can create the product, such as the advertisement, the user interface, and/or software. If the product is a physical object, the processor, to create the project, can send instructions to an operator or a machine to produce the product. For example, the processor can send instructions to a three-dimensional printer to print the product according to the generated values.

In step 740, the processor can obtain a response data to the created product. If the product is an advertisement, the user response can include an impression, a click, a purchase, revenue, time usage, engagement with the product, short-term revenue, long-term revenue, etc. To obtain the response data, the processor can obtain user response data after the product is presented to the user. Alternatively, or in addition, the processor can obtain the user response data from a simulator simulating the user behavior, and consequently user response data. Obtaining the user response data from a simulator can reduce the iteration time to generate a new configuration file 145 in FIG. 1 compared to obtaining the user response from a real user. Consequently, the product can be efficiently designed and generated prior to being sold.

Figure 8:
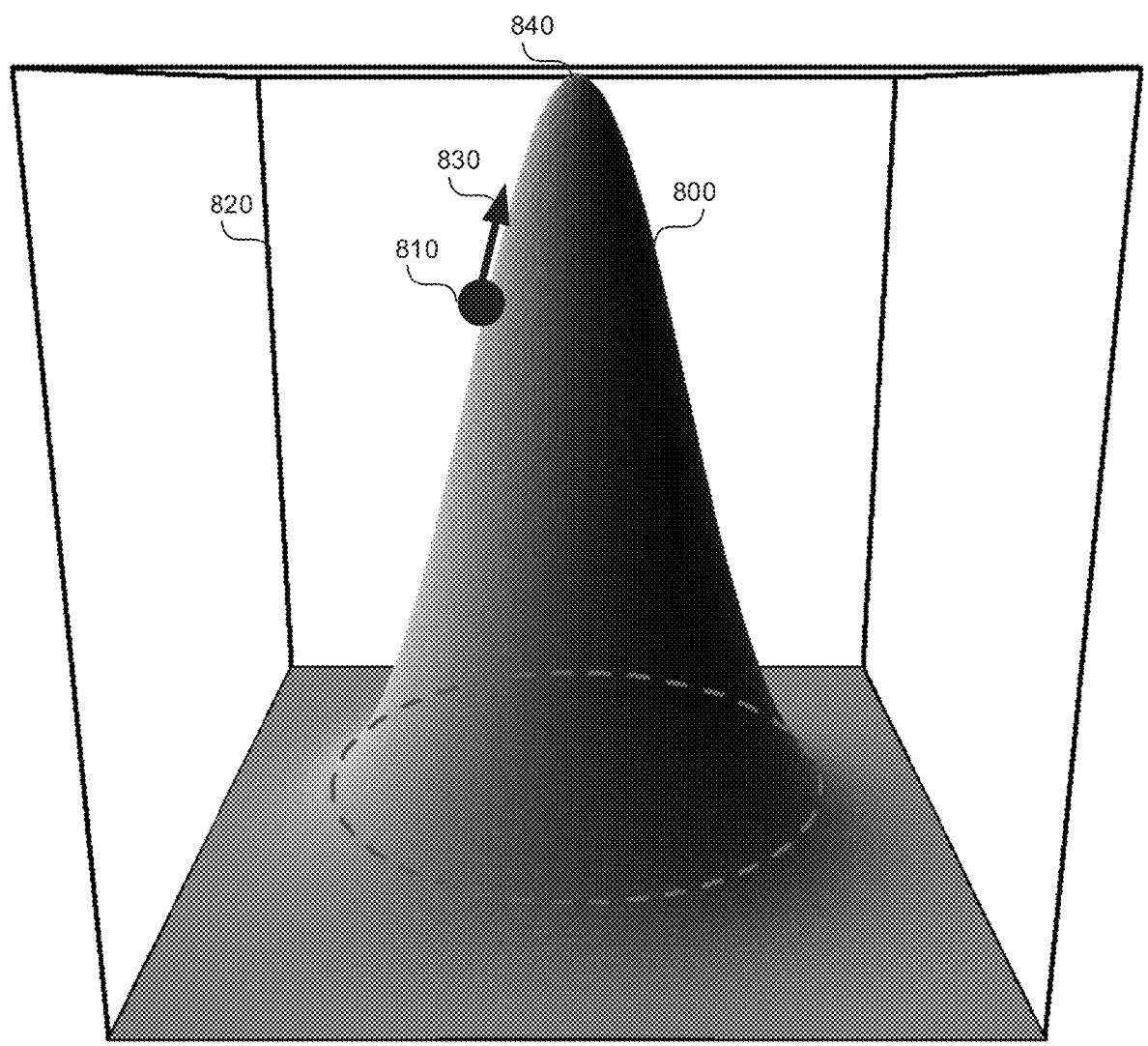
FIG. 8 shows a multidimensional function used to determine attribute values and ranges.

In step 750, the processor can fit a multidimensional function, such as a function shown in FIG. 8, to at least a part of the multiple attributes, the context, and the user response data. To fit the function, the processor can obtain a property of the user response data to optimize. The property can be the objective function, and can include short-term revenue, long-term revenue, number of clicks, etc. The property can be extracted from the user response data. In one embodiment, the processor can fit the multidimensional function to the multiple attributes and to the context in the extracted objective function. In another embodiment, the processor can fit the multidimensional function to the multiple attributes, the context, and one or more extracted objective functions. In other words, the multidimensional function can be a function of short-term revenue, long-term revenue, number of clicks, user engagement, an impression, time usage, engagement with the product, etc.

In step 760, based on the multidimensional function, the processor can determine next values and next ranges associated with the next values, where the next values and the next ranges indicate an improvement in the response data.

FIG. 8 shows a multidimensional function used to determine attribute values and ranges. The multidimensional function 800 can be a function of the attributes, context, and user data. While the multidimensional function 800 is three-dimensional, the multidimensional function can have more than three dimensions. Point 810 of the multidimensional function 800 can represent the current values of the attributes, context, and user data. To determine the next values and the next ranges, the processor can obtain a property of the multidimensional function 800 to optimize, such as an impression, a click, a purchase, revenue, time usage, engagement with the product, short-term revenue, or long-term revenue. The dimension 820 can be the property of the multidimensional function 800 to optimize.

Based on the current values 810, the processor can determine a direction 830 associated with the multidimensional function 800 in which the property 820 is optimized. To determine the direction 830, the processor can use maximization techniques such as gradient descent, simulated annealing, and/or hill climbing. Based on the direction, the processor can determine the next values and the next ranges associated with the multiple next values by, for example, adding a portion of the direction 830 to the current values.

Returning to FIG. 7, the processor can iteratively perform the steps 710-760 until a local or a global optimum 840 (e.g., a minimum or maximum) in FIG. 8 of the multidimensional function 800 in FIG. 8 is reached, and the processor decides to stop exploring. Alternatively, or in addition, in each iteration the processor can perform the following steps. The processor can modify the configuration file based on the next values in the next ranges. The processor can generate a second set of values, wherein the second set of values is within the multiple ranges and the multiple next values. The processor can generate a second product based on the second set of values. The processor can obtain a user response data to the second advertisement. The processor can determine multiple second next values and multiple second ranges, associated with the attribute, wherein the multiple second next values and the multiple second ranges indicate an improvement in the user response data.

To determine the value of the attribute, the processor can vary the value based on the context. For example, the processor can determine that the optimal ads per page are three for iOS and five for Android, where iOS and Android are context variables, and the optimal advertisement for page is an attribute.

The processor can determine causal relations between variables including the multiple attributes, the context, and the user response data by analyzing the multiple values, the multiple attributes, and the user response data. For example, the processor can determine that in China an advertisement for European cars produces higher revenue, while in United States an advertisement for Asian cars produces higher revenue. To determine causal relations, the processor can determine correlation, and can do so over multiple versions of the configuration file. Once causal relationships are established, the processor can reduce dimensionality of the multidimensional function 800 in FIG. 8 by removing one of the variables causally linked to the other. Consequently, upon determining the causal relations, the processor can increase the speed of calculating the multidimensional function by removing dimensions associated with the multiple variables having the causal relations with each other.

The processor can define a property of the multidimensional function to optimize, wherein the property includes a long-term goal, and wherein optimizing the property over the long-term includes a short-term loss. For example, the property to maximize can be "revenue," and the variables can be "number of advertisements" and "length of advertising display." A single user could receive the same attribute values over a long period, like three months, and the objective is to maximize future revenues by extrapolating trends of user behavior into the future when the immediate response (increasing number of ads increases revenue) is different from the long-term response (increasing number of ads drives away users, lowering revenue). Alternatively, the processor can optimize the property over a short-term, ignoring the long-term consequences.

The processor can test statistical significance of the fit between the multidimensional function and the attributes, context, and user response data. To perform the tests, the processor can determine a difference between the multidimensional function and the user response data. The processor can evaluate a second fit of the multidimensional function to a second user response data different from the user response data by determining a second difference between the multidimensional function and the second user response data. When the fit is smaller than the second fit, the processor can select the multidimensional function as fitting the user response data.

Computer

Figure 9:
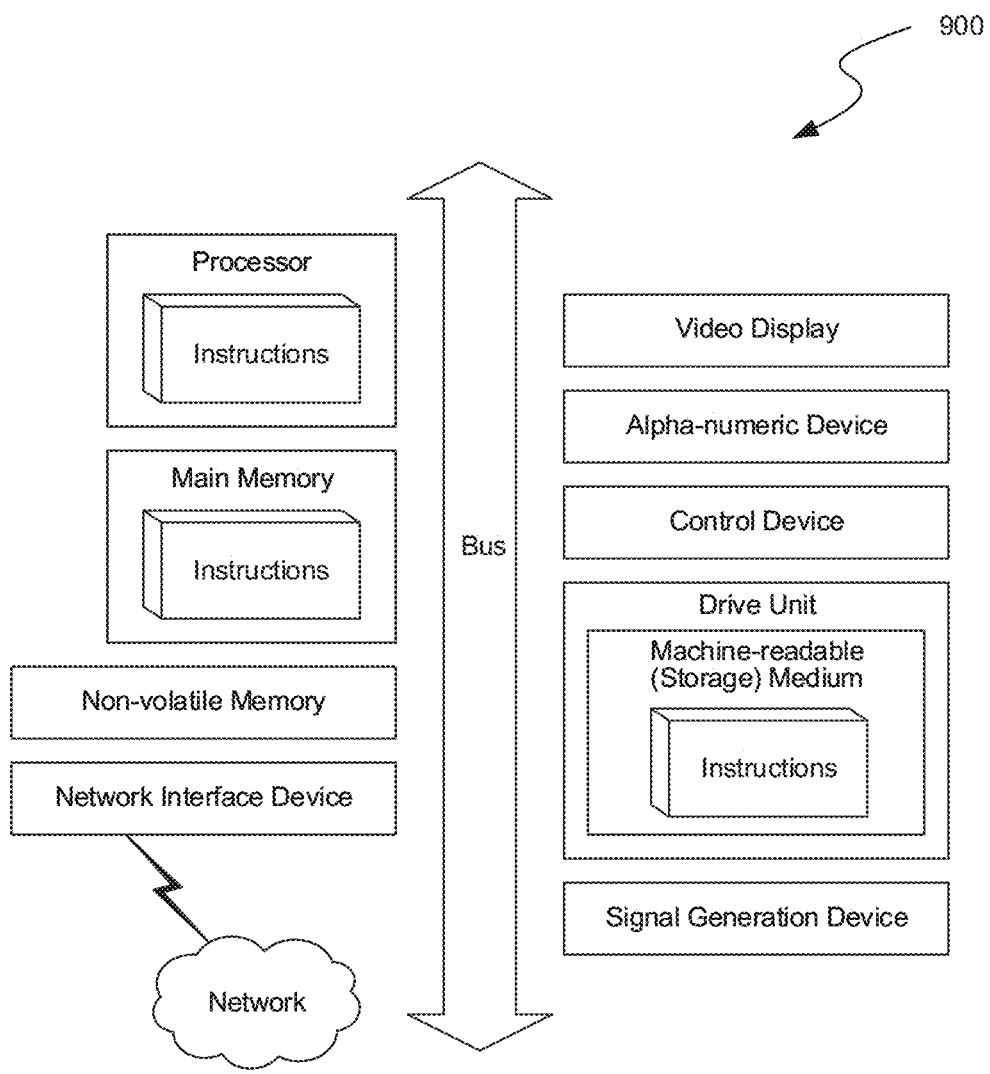
FIG. 9 is a diagrammatic representation of a machine in the example form of a computer system within which a set of instructions, for causing the machine to perform any one or more of the methodologies or modules discussed herein, may be executed.

FIG. 9 is a diagrammatic representation of a machine in the example form of a computer system 900 within which a set of instructions, for causing the machine to perform any one or more of the methodologies or modules discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

The processor of the computer system 900 can execute the various steps and instructions described in this application, such as the steps described in FIG. 7. The processor can execute the instructions associated with the configuration interpreter 130 in FIG. 1, the production system 160 in FIG. 1, the analysis system 105 in FIG. 1, and/or the function fitter and maximizer 115 in FIG. 1. The processor of the computer system 900 can also be associated with the user device 170 in FIG. 1. The main memory, the nonvolatile memory, and/or the drive unit of the computer system 900 can provide storage for the version control system 120 in FIG. 1, the configuration file 110 in FIG. 1, and for instructions implementing the system 100, described in this application. The network interface device of the computer system 900 can be used to communicate between various components of the system 100, and between the system 100 and the user device 170.

This disclosure contemplates the computer system 900 taking any suitable physical form. As an example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Washington, and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the Detailed Description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method to continually generate an effective advertisement by determining attributes of an advertisement presented to a user at a user device, the method comprising:
    training a neural network to fit attribute values and context variables to a set of user response data;
    obtaining a plurality of attributes of the advertisement to be presented at the user device and a plurality of context variables,
        wherein the plurality of attributes comprises a percentage of a screen of the user device occupied by advertisements, and advertisement quality control,
        wherein an attribute in the plurality of attributes comprises a continuous value, wherein a range of acceptable values is uncertain, and
        wherein the plurality of context variables comprises at least a device type of the user device;
    creating a configuration file having each of the plurality of attributes with a distribution indicating a probability of occurrence of a value of an attribute,
        wherein the configuration file is adapted to be stored in a version control system;
    generating a plurality of attribute values corresponding to the plurality of attributes based on the configuration file;
    generating the advertisement based on the plurality of attribute values;
    presenting the generated advertisement to a device associated with the user;
    obtaining a user response data to the presented advertisement;
    fitting a multidimensional function to at least a part of the plurality of attributes, the plurality of context variables, and one or more objective functions extracted from the user response data by applying the neural network to the plurality of attributes, the plurality of context variables, and the one or more objective functions;
    determining a causal relation between a plurality of variables comprising the plurality of attributes, the plurality of context variables, and the user response data by analyzing the plurality of values, the plurality of attributes, and the user response data;
    upon determining the causal relation, increasing speed of calculating the multidimensional function by removing a dimension associated with the plurality of variables having the causal relation with each other; and
    modifying the configuration file using a plurality of next attribute values and a plurality of next ranges associated with the plurality of next attribute values determined based on the multidimensional function, wherein the plurality of next attribute values and the plurality of next ranges indicate an improvement in the user response data.

2. The method of claim 1, comprising:
    modifying the configuration file based on the plurality of next attribute values in the plurality of next ranges;
    generating a second plurality of values, wherein the second plurality of values is within the plurality of next ranges and the plurality of next attribute values;
    generating a second advertisement based on the second plurality of values;
    obtaining the user response data to the second advertisement; and
    determining, by the multidimensional function, a second plurality of next attribute values and a second plurality of next ranges, associated with the attribute, wherein the second plurality of next attribute values and the second plurality of next ranges indicate a second improvement in the user response data.

3. The method of claim 1, said obtaining the user response data to the advertisement comprising:
    simulating the user response data; and
    obtaining the simulated user response data.

4. The method of claim 1, the user response data comprising at least one of a click, an engagement, and a revenue.

5. The method of claim 1, comprising:
    determining the value of the attribute in the plurality of attributes based on the plurality of context variables.

6. The method of claim 1, comprising:
    evaluating a fit of the multidimensional function to the user response data by determining a difference between the multidimensional function and the user response data;
    evaluating a second fit of the multidimensional function to a second user response data different from the user response data by determining a second difference between the multidimensional function and the second user response data; and
    when the fit is smaller than the second fit, selecting the multidimensional function as fitting the user response data.

7. The method of claim 1, said determining the plurality of next attribute values and the plurality of next ranges comprising:
    obtaining a property of the multidimensional function to optimize;
    based on the plurality of values, determining a direction associated with the multidimensional function in which the property is optimized; and
    based on the direction, determining the plurality of next attribute values and the plurality of next ranges associated with the plurality of next attribute values.

8. The method of claim 1, comprising:
    obtaining from the configuration file a name of the attribute, a distribution indicating a probability of occurrence of the value of the attribute, and an epoch counter;
    obtaining a unique user identification (ID) associated with the user;
    generating a unique seed based on the user ID, the name of the attribute and the epoch counter;
    generating a random number based on the unique seed; and
    generating the value of the attribute based on the unique seed and the distribution.

9. The method of claim 1, comprising:
defining a property of the multidimensional function to optimize, wherein the property includes a long-term goal, and wherein optimizing the property over a long-term includes a short-term loss.

10. The method of claim 1, wherein the plurality of attributes comprises a percentage of screen occupied by advertisements, and advertisement quality control.

11. The method of claim 1, wherein the plurality of context variables comprises at least one of a country, a device, or a season.

12. The method of claim 1, comprising:
iteratively applying the neural network to new sets of attributes, context variables, and user response data for a plurality of versions of the configuration file until the multidimensional function reaches a global optimum.

13. A system for continually generating an effective advertisement by determining attributes of an advertisement presented to a user at a user device, the system comprising:
one or more processors;
a memory coupled to the one or more processors, wherein the memory includes instructions executable by the one or more processors to:
train a neural network to fit attribute values and context variables to a set of user response data;
obtain a plurality of attributes of the advertisement to be presented at the user device and a plurality of context variables,
wherein the plurality of attributes comprises a percentage of a screen of the user device occupied by advertisements, and advertisement quality control,
wherein an attribute in the plurality of attributes comprises a continuous value, wherein a range of acceptable values is uncertain, and
wherein the plurality of context variables comprises at least a device type of the user device;
create a configuration file having each of the plurality of attributes with a distribution indicating a probability of occurrence of a value of an attribute,
wherein the configuration file is adapted to be stored in a version control system,
generate a plurality of attribute values corresponding to the plurality of attributes based on the configuration file;
generate the advertisement based on the plurality of attribute values;
present the generated advertisement to a device associated with the user;
obtain a user response data to the presented advertisement;
fit a multidimensional function to at least a part of the plurality of attributes, the plurality of context variables, and one or more objective functions extracted from the user response data by applying the neural network to the plurality of attributes, the plurality of context variables, and the one or more objective functions;
determine a causal relation between a plurality of variables comprising the plurality of attributes, the plurality of context variables, and the user response data by analyzing the plurality of values, the plurality of attributes, and the user response data;
upon determining the causal relation, increase speed of calculating the multidimensional function by removing a dimension associated with the plurality of variables having the causal relation with each other; and
modify the configuration file using a plurality of next attribute values and a plurality of next ranges associated with the plurality of next attribute values determined based on the multidimensional function, wherein the plurality of next attribute values and the plurality of next ranges indicate an improvement in the user response data.

14. The system of claim 13, further comprising a version control system configured to store the configuration file.

15. The system of claim 13, further comprising instructions executable by the one or more processors to:
create a second configuration file based on the plurality of next values and the plurality of next ranges;
based on the second configuration file, generate a second plurality of values corresponding to the plurality of attributes;
create a second product based on the second plurality of values; obtaining a second response data to the second product;
fit a second multidimensional function to at least a part of the plurality of attributes having the second plurality of values and the second response data; and
based on the second multidimensional function, determine a second plurality of next values and a second plurality of next ranges associated with the plurality of next values, wherein the plurality of next values and the plurality of next ranges indicate a second improvement in the response data, and wherein the second plurality of next values and the second plurality of next ranges are configured to be used in a next iteration.

16. The system of claim 13, the instructions to determine the plurality of next values and the plurality of next ranges comprising instructions to:
obtain a property of the multidimensional function to optimize;
based on the plurality of values, determine a direction associated with the multidimensional function in which the property is optimized; and
based on the direction, determine the plurality of next values and the plurality of next ranges associated with the plurality of next values.

17. The system of claim 13, further comprising instructions executable by the one or more processors to:
obtain from the file a name of the attribute, a distribution indicating a probability of occurrence of the value of the attribute, and an epoch counter;
obtain a unique user identification (ID) associated with a user;
generate a unique seed based on the user ID, the name of the attribute and the epoch counter; generate a random number based on the unique seed; and
generate the value of the attribute based on the unique seed and the distribution.

18. The system of claim 13, the instructions to obtain the response data to the created product comprising instructions to:
simulate the response data; and
obtain the simulated response data.

19. The system of claim 13, further comprising instructions executable by the one or more processors to:
iteratively apply the neural network to new sets of attributes and user response data for a plurality of versions of the file until the multidimensional function reaches a global optimum.

* * * * *